Figure 1:
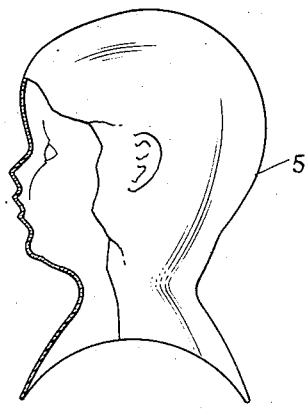

Oct. 15, 1940.   C. DREYFUS   2,217,734
METHOD OF MAKING SHAPED ARTICLES CONTAINING ORGANIC
DERIVATIVES OF CELLULOSE
Filed Jan. 21, 1936

INVENTOR
Camille Dreyfus
ATTORNEYS

Patented Oct. 15, 1940

2,217,734

UNITED STATES PATENT OFFICE 2,217,734

METHOD OF MAKING SHAPED ARTICLES CONTAINING ORGANIC DERIVATIVES OF CELLULOSE

Camille Dreyfus, New York, N. Y.

Application January 21, 1936, Serial No. 60,068

5 Claims. (Cl. 18—58)

This invention relates to the manufacture of hollow articles from organic plastic masses and more particularly from plastic masses containing derivatives of cellulose.

An object of the invention is the production of hollow articles, the inside surfaces of which are true to the desired shape. Another object of the invention is the production of hollow articles that have no fins or other objectionable mold marks. Other objects of the invention will appear from the following detailed description.

Hollow articles have been made by coating molds or cores with solutions or moldable masses of organic plastic compositions. Plastic compositions, upon drying, usually contract, making it difficult to remove the article from the core or mold. There may also be a slight sticking of the plastic material to the mold or core, which renders the removal of the core, as a unit, very difficult. For this reason, interior molds having a plurality of mutually displaceable individual portions have been employed. The sectional molds are objectionable, however, in that they produce on the walls of the article fins or mold section joint marks which have to be removed, sometimes with great difficulty or by tedious hand labor methods. The use of sectional molds or solid molds or cores of the type formerly used was limited in that only articles having a fairly large opening into the cavity could be made, as this large opening was necessary for the removal of the mold or core and the grinding and cutting away of the fins and mold marks.

By employing this invention, there may be made from organic plastic materials hollow articles that have the exact cavity shape desired, which cavity shape is produced with the formation of the article and does not require grinding and machining. Furthermore, by employing this invention, hollow articles having a smaller opening leading to the cavity than could be made by methods used prior to this invention may be made.

In accordance with my invention, I form hollow articles by coating an easily breakable mold or core with a solution or moldable plastic mass of organic plastic composition. Then, after the plastic mass has become hardened, I break the mold or core into sections which are easily removable from the article. Also, in accordance with my invention, I may use low melting point materials as the core, which core, after the article is formed thereon, may be melted out of the center. I may also employ a soluble material as the core, and after the formation of the article dissolve the core therefrom.

This invention may be employed in forming cylindrical, or other shaped, pipes, tobacco pipe bowls, stems, etc., doll heads, arms, bodies, etc., electrical fuse housings, switch housings, light socket housings, and other electrical apparatus housings, bottles, drinking glasses, finger cots, valve housings and parts for liquid and gas dispensing apparatus, thermometer casings, technical instrument casings, clock cabinets, radio cabinets, casing for radio parts, etc. This invention may be employed wherever it is desired to form an article from an organic plastic mass, which article is to have a cavity of a definite shape. It is particularly of importance in the manufacture of articles designed to contain technical instruments or the like which require a cavity having a more or less exact shape and exact dimensions.

The mold or core about which the article is made may be of glass, china ware, earthenware or other vitreous or fragile material. Although any of these materials may be employed, it is preferable to employ a low melting point glass, as this enables the reworking of the core material in an economical manner and permits also of the formation of very intricate shapes. The core or mold may be shaped by blowing the core material into steel molds as in glass blowing, by blowing and shaping individual pieces by hand, or by other methods of forming glass articles. When the core or mold is formed from clay or similar material, it may be shaped by pressing, by machine or hand, against a molding surface, or it may be cast by centrifugal molding methods or by other methods of forming china or earthenware. When the article is formed of china or earthenware, the same may be glazed or it may be left in the unglazed state but having a protective coating of shellac or other material applied thereto to reduce the porosity of the surface and to prevent the plastic material from being absorbed thereby. The thickness of the walls of the core or mold is preferably just sufficient to enable the core to withstand, without breaking, the molding operations. However, cores of thicker material may be employed.

Although the articles may be formed from any organic plastic material, this invention is particularly applicable to the formation of articles from derivatives of cellulose, such as cellulose nitrate, organic acid esters of cellulose and cellulose ethers, or the mixed esters and ethers of cellulose. Examples of organic acid esters of cellulose are cellulose acetate, cellulose formate, cellulose propionate and cellulose butyrate, while examples of cellulose ethers are ethyl cellulose, methyl cellulose and benzyl cellulose.

Although plastic materials containing organic derivatives of cellulose are preferred, the articles also may be made from any other suitable organic plastic material. Thus, various synthetic resins may be employed. These resins may be the phenol-formaldehyde type of resin, the diphenyl propane-formaldehyde type of resin, urea-formaldehyde resin, toluene sulphonamide-formaldehyde resin, the resin formed from vinyl acetate, casein resin, gelatin, etc. These resins may be applied to the core or mold in the form of solutions or plastic compositions, when the soluble and fusible type of resin is employed. If desired, the soluble and fusible type of resin admixed with other reactants may be molded onto the core at elevated temperature to form an article of the infusible type of resin. The phenol-formaldehyde type of resin lends itself to this sort of treatment. The plastic composition may be clear and transparent, it may be translucent, or it may be opaque. If desired, pigments and/or dyes may be added to the plastic composition to impart any suitable or desired color thereto, and variegated or other effects may be imparted to the surface.

When the plastic material employed in forming the article is a derivative of cellulose, the same may be mixed with plasticizers, pigments, dyes, fire retardants and other materials effecting either the physical or chemical nature of the same. For instance, the plastic material may contain any one or a mixture of plasticizers. The plasticizers may be any of the high boiling solvents or softening agents, as, for example, the aryl sulphonamides such as para ethyl toluol sulphonamide, the alkyl phthalates such as dimethyl phthalates, the dialkyl tartrates such as dibutyl tartrate, the alkoxy esters of polybasic organic acids such as diethoxy ethyl phthalate, the polybasic acid esters of the mono alkyl ethers of polyhydric alcohols such as diethylene glycol ethyl ether ester of phthalic acid, the alkyl esters of phosphoric acid such as triethylglycol phosphate, the aryl esters of phosphoric acid such as tricresyl phosphate, the mixed alkyl and aryl phosphates as ethylglycol dicresyl phosphate, and camphor.

The organic derivative of cellulose may also be mixed with filling materials which do not effect the color or transparency of the article, for example, the organic acid esters of the conversion products of cellulose, such as sucrose, starch, cellobiose, or the same may contain filling materials which alter the color and transparency, such as salts and oxides of metals, ground glass, fuller's earth, wood flour, clay, etc.

The plastic material may be applied to the core or mold in any suitable manner. Thus, it may be applied in the form of solutions, plastic masses, etc. When it is applied in the form of a solution, the derivative of cellulose or other material, together with plasticizers that may be desired, is dissolved in a volatile solvent to form a freely flowing solution. The solution is then applied to the core in any suitable manner until the layer of plastic materials adhering to the core is of a suitable thickness. One way of applying the solution to the core or mold is by dipping the core or mold into the solution, removing the core or mold and allowing the volatile solvent to evaporate, then repeating this operation as many times as desired. As a variation, cellulose derivative or other material, with or without a plasticizer, may be mixed with a smaller amount of solvent to form a doughy mass, and this doughy mass may be worked or pressed onto the surface of the articles. In another form, the derivative of cellulose or other material, if the same is thermoplastic, may be applied in finely ground condition, with or without plasticizers, to the surface of the core or mold in the form of powder, or pressed or molded at elevated temperatures to form a continuous layer of the plastic material. When there is a tendency for the plastic material to adhere too strongly of the core or mold, the core or mold may first be coated with a powder or liquid which prevents too strong an adhesion of the plastic to the core.

When the plastic mass is applied to the core or mold from solutions in a volatile solvent, the same may be applied by brushing or spraying or in any other convenient manner, such as by continued dipping of the articles in such solution. The process of coating the core or mold may be repeated as many times as is required until a layer of plastic material of sufficient thickness is obtained.

When the article to be formed is of a simple geometric figure, sheets or films of plastic material may first be pressed against the core or mold and the assembly dipped or coated with a solution of the organic plastic mass, thus embedding the preformed sheets or films in the plastic coating. These sheets or films of plastic material may be prepared in any suitable manner, such as by cutting blocks of the same into sheets, or by flowing freely flowing solutions of the same onto smooth surfaces, permitting the volatile solvents to evaporate, and then stripping the sheets or films thus formed from the surfaces.

In many cases, it may be desired that the outside of the article should also conform to a specific configuration. These articles may be formed by first building onto a core or mold a sufficient thickness of the plastic mass, then grinding, sawing, milling, carving or otherwise shaping the outside of the article. Also, the core or molds having the desired depth of coating of the plastic mass may be inserted in molding devices whereby, either with or without additional material being added, the outside of the article is caused to conform to a mold. This operation may be accompanied by heat when working with thermoplastic materials. When there are being formed articles which are made having comparatively thin walls, it is preferable, but not necessary, that the shaping of the outside by milling, polishing, grinding, etc., be done prior to the removal of the mold or core from the center of the article. By shaping the outside of the article while the core or mold is still present therein, ease of working is obtained due to the rigidity of the article.

After the article is formed the mold or core may be removed from the center by crushing or breaking the fragile material from which it is formed. Where the core or mold is formed of relatively thin glass, the glass may be shattered by a slight blow of the article against a rigid member and the glass shaken from the article. This blow against the outside of the article may be sufficient to break the core or mold and yet not sufficient to damage or mar the outside of the article. Other methods of crushing or breaking the core or mold may be employed, such as hitting the core or mold directly by inserting a metal pin into the article. As stated above, the use of glass as the core or mold is of advantage as the broken glass removed from the article may be remelted and reshaped and reformed into another core.

After the articles have been formed and the mold or core removed therefrom by the method described above, the interior of the article may be polished by dipping the same in a solvent for the material and immediately removing the solvent. In a like manner the outside of the article may be polished after the same has been shaped to the desired configuration. As an example, a formed article containing cellulose acetate may be dipped into and immediately withdrawn from a solution containing about 50% acetone and 50% water.

By the above method, it is very easy to form molded hollow articles having metallic or other inserts placed therein. As an example, the core made of glass may have metal bands or objects attached thereto prior to being coated with the organic plastic material. After the removal of the glass core the metal band or object will remain embedded in the interior walls of the article.

Figure 2:
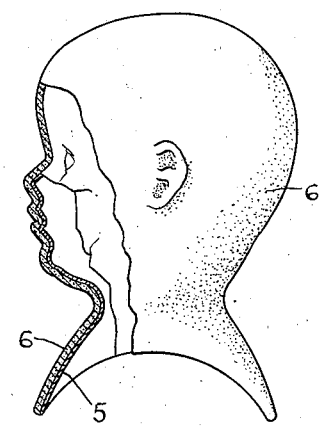
Figure 3:
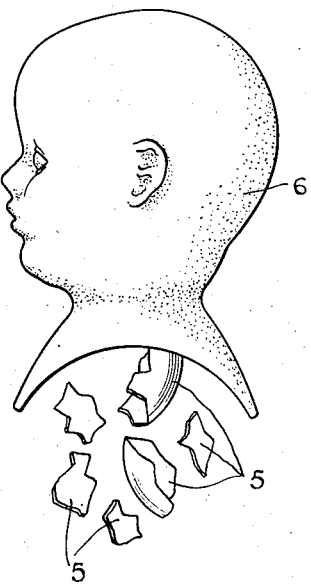

The present invention will now be described with reference to the accompanying drawing, wherein Figure 1 is a view, partly in section, of a mold for a doll's head;

Figure 2 is a view, partly in section, of the mold coated with a layer of plastic material; and Figure 3 is a view of the doll's head showing the pieces of the broken mold falling out of the hollow interior of said doll's head.

Like reference numerals indicate like parts throughout the several views of the drawing.

Referring to Figure 1, there is shown a mold or core 5 for use in molding a doll's head. The core or mold 5 comprises a shell of any fragile vitreous material such as glass, chinaware or earthenware. To the mold or core is applied, in any suitable manner, an organic plastic material 6 in the desired thickness. After the article is formed and set, the assembly is given a slight blow which shatters the mold or core 5, and the pieces thereof are shaken from the article as is shown in Figure 3.

It is to be understood that the foregoing detailed description is given merely by way of illustration and that many variations may be made therein without departing from the spirit of my invention.

Having described my invention, what I desire to secure by Letters Patent is:

1. Process for the production of hollow articles having openings communicating with the interior thereof, which comprises applying an organic plastic material to a core comprising a shell of fragile vitreous material, and subsequently removing the core from the hollow article thereby produced by breaking the core into pieces, all of the openings of said hollow articles having dimensions that are smaller than the dimensions of said hollow articles.

2. Process for the production of hollow articles having openings communicating with the interior thereof, which comprises applying an organic derivative of cellulose to a fragile core comprising a shell of glass, and subsequently removing the core from the hollow article thereby produced by breaking the core into pieces, all of the openings of said hollow articles having dimensions that are smaller than the dimensions of said hollow articles.

3. Process for the production of hollow articles having openings communicating with the interior thereof, which comprises applying cellulose acetate to a fragile core comprising a shell of glass, and subsequently removing the core from the hollow article thereby produced by breaking the core into pieces, all of the openings of said hollow articles having dimensions that are smaller than the dimensions of said hollow articles.

4. Process for the production of hollow articles having openings communicating with the interior thereof, which comprises applying metallic articles to the outside of a core comprising a shell of fragile vitreous material, applying a thermoplastic derivative of cellulose to said core to form the hollow article, and subsequently removing the core from the hollow article thereby produced by breaking the core into pieces, whereby the article formed has the metallic articles embedded therein, all of the openings of said hollow articles having dimensions that are smaller than the dimensions of said hollow articles.

5. Process for the production of hollow articles having openings communicating with the interior thereof, which comprises applying an organic plastic material to a core comprising a shell of fragile vitreous material having walls of thickness only just sufficient for the core to withstand the molding operation without fracture, and subsequently removing the core from the hollow article thereby produced by breaking the core into pieces, all of the openings of said hollow articles having dimensions that are smaller than the dimensions of said hollow articles.

CAMILLE DREYFUS.